June 13, 1950
J. A. H. CASTONGAY
2,511,527
COMBINED CHAIN MOUNTING AND ANTISKID
DEVICE FOR AUTOMOBILES
Original Filed June 24, 1947
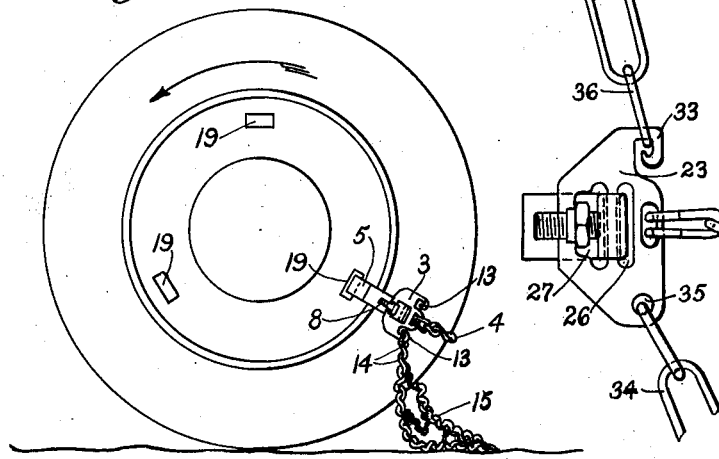
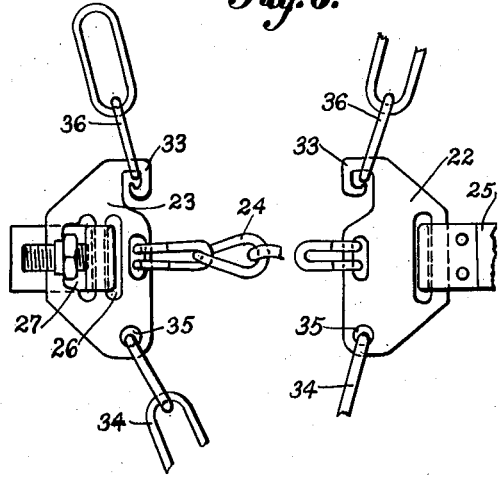
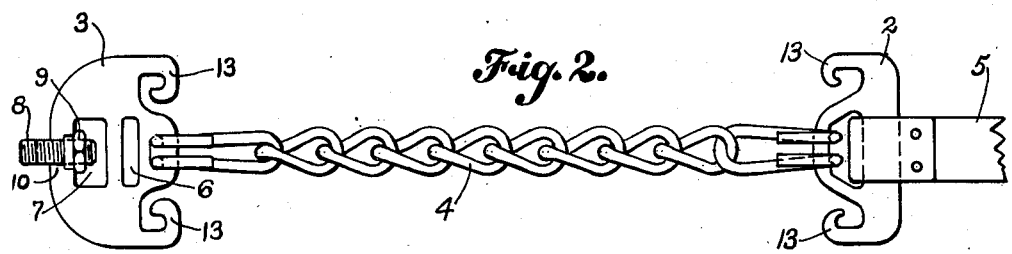
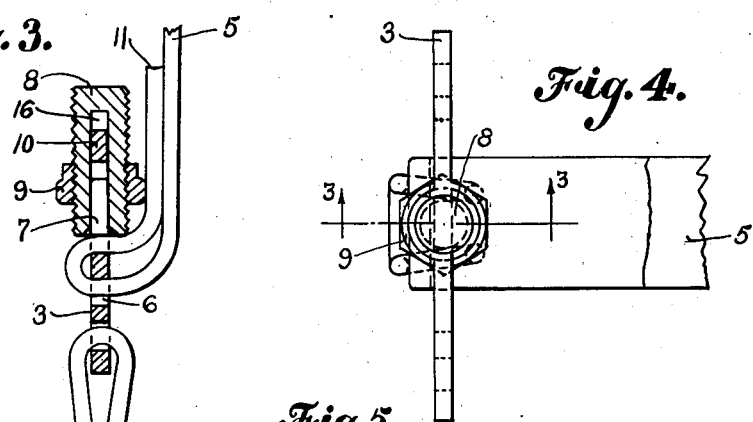
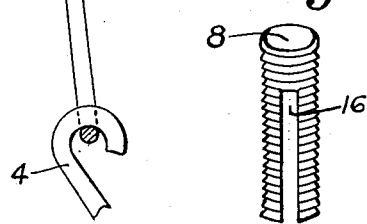
INVENTOR.
Joseph A. H. Castongay
BY
Heard Smith Tennant
Attorneys.

Patented June 13, 1950

2,511,527

UNITED STATES PATENT OFFICE 2,511,527

COMBINED CHAIN MOUNTING AND ANTI-SKID DEVICE FOR AUTOMOBILES

Joseph A. H. Castongay, North Andover, Mass.

Original application June 24, 1947, Serial No. 756,603. Divided and this application October 20, 1947, Serial No. 780,854

5 Claims. (Cl. 152—213)

This invention relates to a combined chain mounting and anti-skid device for automobiles, and it has for its object to provide a novel device which can be used to facilitate the mounting of a tire chain on a tire without jacking up the car, which device may either form a permanent component part of the mounted tire chain, or may be made separate from the tire chain and thus usable as a temporary anti-skid element of of the type familiarly known as a "mud hook" or a "grip chain."

In order to give an understanding of the invention, I have illustrated in the drawings some selected embodiments thereof which will now be described after which the novel features will be pointed out in the appended claims.

In the drawings:

Fig. 1 is a view showing the manner in which the apparatus is used for mounting a tire chain on an automobile wheel.

Fig. 2 is a view illustrating the device.

Fig. 3 is an enlarged section through the clamping screw and illustrating the manner in which the strap is clamped to the outer plate.

Fig. 4 is an edge view of the outer plate.

Fig. 5 is a perspective view of the clamping screw.

Fig. 6 is a fragmentary view showing an embodiment of the invention in which the chain mounting device forms a permanent part of the complete tire chain.

My improved combined tire mounting and anti-skid device comprises two plate elements, an inside plate element and an outside plate element adapted for engagement with the inside and outside of the inner face and outer face of the tire, a connecting element which may be in the form of a cross chain connecting said elements, and adapted to engage the tread of the tire, and a strap permanently connected to the inside element and adapted to pass around the inner side of the wheel rim through one of the openings in the wheel provided for that purpose and to be detachably clamped to the outside plate element.

As stated these plate elements together with the cross chain and strap may form a permanent part of the complete tire chain in which case the device will remain permanently on the tire when the tire chain is mounted, or it may be separate and detachable from the tire chain, in which case the device may be used for mounting the tire chain on the tire and may then be removed from the tire. The device in its detachable form is also capable of being used as a temporary anti-skid chain.

Referring first to Figs. 1 and 2 wherein the device is illustrated as an element separable from the tire chain itself, said device comprises the inner plate element 2 and the outer plate element 3 which are connected by a cross connection element 4 herein shown as a cross chain.

The outer plate 3 is formed with two slots 6 and 7, the slot 6 being a relatively narrow slot of a size to permit the strap 5 to be freely passed therethrough, and the slot 7 being a somewhat wider slot and having associated therewith my novel strap clamping means.

Such strap clamping means comprises a clamping screw 8 provided with a diametrical slot extending from its inner end nearly to its outer end, and a clamping nut 9 having screw threaded relation to said clamping screw.

The bifurcated clamping screw 8 is mounted on the edge 10 of the outside plate member 3 in straddling relation, and the clamping nut 9 which has screw threaded engagement with the clamping screw is located in the wider slot 7.

The free end 11 of the strap 5 is locked to the outside plate 3 by passing the end of the strap through the slot 6 from the inside to the outside of the plate, and then threading the end of the strap through the wider slot 7 from the outside to the inside. At this time the clamping screw is backed off somewhat so as to permit the end of the strap to be freely passed through the slot 7.

After the strap has been drawn tight around the rim of the wheel and threaded through the two slots as above described, the clamping nut 9 is turned to advance the clamping screw 8 and cause its inner end to firmly grip the portion of the strap which passes through the wider slot 7. The inner end of the clamping screw 8 may be slightly concave to enable said end to obtain a better clamping grip on the strap.

In the device shown in Fig. 2, in which said device is separable from the tire chain to be mounted, each of the plates 2 and 3 is shown as having two open hook portions 13, one at each end of each plate. When the device with this construction is to be used for mounting a tire chain on a wheel, it will first be applied to the wheel in the manner above described, that is, by placing the cross chain element 4 against the tread element of the tire with the inside plate 2 on the inside of the tire and the outside plate 3 on the outside, and by passing the strap 5 through the opening 12 in the wheel provided for that purpose and threading the free end of the strap first through the narrow slot 6 from the inside to the outside of the outside plate 3, and then passing the free end of the strap back through the wider slot 7, the strap being drawn tightly around the rim of the wheel.

By turning the nut 9 the clamping screw 8 will be advanced to lock the strap to the outside plate 3.

The ends of the side chains 14 of a tire chain 15 are then hooked to the open hook members 13, and the automobile is rolled forward during which movement, the tire chain 15 will be carried up over the top of the wheel.

When the wheel has made one complete revolution, then the two ends of the side chains 14 are disconnected from the hook portion 13, and the two ends of each side chain are connected together by the fastening devices provided on the tire chain for that purpose.

The combined tire mounting and anti-skid device may then be removed from the wheel by loosening the clamping screw 8 and withdrawing the end of the strap from the outside plate.

In Fig. 6 there is shown an embodiment of the invention in which the tire mounting device is made as a permanent part of the complete tire chain. This embodiment of the invention comprises the two plate elements 22 and 23, of which the plate element 22 is the inside plate element and the plate element 23 the outside plate element corresponding to the inside and outside plate elements 2 and 3 of Fig. 2.

These two plate elements are connected by the cross chain 24 corresponding to the cross chain 4 of Fig. 2, and the inside element 22 has permanently attached thereto a strap 25 corresponding to the strap 5 of Fig. 2.

The outside plate element is also provided with the two slots 26, 27, corresponding to the slots 6 and 7 of Fig. 2, and with the bifurcated clamping screw 8 and its nut 9.

In the device shown in Fig. 6 one end of the tire chain element is permanently secured to the two plates 22, 23. The ends of the two side chains of the tire element are shown at 34 and each plate 22 and 23 is provided with a hole 35 through which the end link 34 of a side chain passes, said plates thus being permanently secured to the ends 34 of the side chains.

Each plate 22, 23 is provided at its other end with an open hook portion 33 to which the other end 36 of the side chains may be hooked. Each open hook 33 is situated in the plane of the corresponding plate and is entirely separate and independent from the clamping screw 8 which constitutes the means for clamping the strap 5 to the outside plate.

In using the device shown in Fig. 6, the two plates 22, 23 with the cross chain element 24 and the strap 25 is secured to the wheel in the manner above described, that is by placing the cross chain element 24 against the tread portion of the tire with the plate 22 on the inside face of the tire and the plate 23 on the outside face, and then passing the free end of the strap 25 through one of the openings 19 in the wheel provided for this purpose and subsequently locking the strap to the outside plate 23 by passing the strap first through the narrow slot 26 and then through the wider slot 27, and then tightening the nut 9 to clamp the clamping screw against the strap.

When these parts have been thus secured to the wheel, the automobile is rolled forward until the wheel makes a complete rotation thereby mounting the tire chain on the wheel, and after such complete rotation, the ends 36 of the side chains may be hooked onto the hook portions 33 thereby securing the tire chain in place.

In this embodiment the plates 22, 23 and the cross chain 24 remain mounted on the tire so long as the chain is in use, because said plates 22, 23 are permanently attached to one end of the side chains.

The device shown in Fig. 2 has the advantage that if driving conditions are such that it is desirable to merely mount on the tire a temporary anti-skid device and complete tire chains are not needed, then the device herein shown can be secured to the wheel in the manner above described and used as an ordinary anti-skid chain.

One advantage of providing the side plates with a hooked portion 13 at each end is that when it is desired to install a tire chain on an automobile wheel, the automobile may be in such a position that it cannot be easily moved forward. In such case the device will be attached to the wheel as above described and the ends of the side chains 14 of the tire chain 15 will be attached to the hooks 13 on the other end of the plates from that shown in Fig. 1 after which the automobile will be rolled backward thereby mounting the tire chain on the wheel.

Another advantage resulting from the provision of the hooks 13 at each end of each side plate is that it makes it possible to use tire chains in which the fastening means at the end of the side chains has been damaged or broken off.

Such damaged or broken chains can be still made useful with my device by mounting them on the tire in the manner above described and then subsequently securing the damaged ends of the side chains to the other hooks 13 of the plates 2 and 3. In such case the combined chain mounting and anti-skid device will remain attached to the tire and will constitute the means for connecting the ends of the side chains of the tire chain.

This application is a continuation in part of my application Serial No. 756,603, filed June 24, 1947.

I claim:

1. A combined tire chain mounting and anti-skid device for automobiles comprising an inside plate element and an outside plate element, each plate element having at one end means for attaching thereto the end portion of a side chain of a tire chain and at the other end an open hook for detachably engaging the other end of said side chain, a cross chain element connecting said plate elements, an attaching strap secured to the inside plate element and adapted to pass around the rim of an automobile wheel for fastening said device thereto, the outside plate element having a slot to receive the free end of the strap and strap clamping means carried by the outside plate and separate from the open hook thereon for clamping the strap thereto.

2. A combined tire chain mounting and anti-skid device for automobiles comprising an inside plate element and an outside plate element, each plate element having at one end means for attaching thereto the end portion of a side chain of a tire chain, a cross chain element connecting said plate elements, an attaching strap secured to the inside plate element, the outside plate element having a narrow slot and a wider slot through which the free end of the strap is threaded, a slotted clamping screw embracing the edge of said outside plate element and a clamping nut occupying the wider slot and having a screw threaded engagement with said slotted clamping screw whereby turning movement of the nut will clamp the screw against the portion of the strap which passes through the wider slot and thus lock the strap to said outside plate.

3. A combined tire chain mounting and antiskid device for automobiles comprising an inside plate element and an outside plate element each having at each end a hook portion adapted to be engaged by the side chains of a tire chain, a cross chain element connecting said plate elements, an attaching strap permanently secured to the inside plate element and by which the device is attached to the automobile wheel, the outside plate element having a narrow slot and a wider slot to receive the free end of the strap, a slotted clamping screw embracing the inner edge of the outside plate element and a clamping nut occupying the wider slot thereof and having screw threaded engagement with said clamping screw whereby turning movement of the nut will cause the screw to clamp the strap against one edge of the wider slot and thereby lock the strap to said outside plate.

4. A combined tire chain mounting and antiskid device for automobiles comprising an inside plate element and an outside plate element, each plate element having at one end means for attaching thereto the end portion of a side chain of a tire chain and having at the other end an open hook situated in the plane of the plate to which the other end of a side chain may be attached, a cross chain element connecting said plate elements, an attaching strap secured to the inside plate element and adapted to pass around the inside of the rim of an automobile wheel when the cross chain element is in engagement with the tread surface thereof, the outside plate element having a slot to receive the free end of said strap, and strap clamping means carried by the outside plate and independent of the open hook thereon for clamping the free end of the strap thereto.

5. A combined tire chain mounting and antiskid device for automobiles comprising an inside plate element and an outside plate element, each plate element having at one end means for attaching thereto the end portion of a side chain of a tire chain and having at the other end a hook portion, a cross chain element connecting said plate elements, an attaching strap secured to the inside plate element, the outside plate element having a narrow slot and a wider slot through which the free end of the strap is threaded, a slotted clamping screw embracing the edge of said outside plate element and a clamping nut occupying the wider slot and having a screw threaded engagement with said slotted clamping screw whereby turning movement of the nut will clamp the screw against the portion of the strap which passes through the wider slot and thus lock the strap to said outside plate.

JOSEPH A. H. CASTONGAY.

REFERENCES CITED

The following references are of record in the file of this patent:

UNITED STATES PATENTS

| Number | Name | Date |
|---|---|---|
| 1,266,507 | Ludwig | May 14, 1918 |
| 1,713,360 | Woodling et al. | May 14, 1929 |
| 2,150,448 | Littmann et al. | Mar. 14, 1939 |